United States Patent
David et al.

(10) Patent No.: US 12,535,994 B2
(45) Date of Patent: Jan. 27, 2026

(54) SYSTEM, METHOD, AND PROCESS FOR DETECTING FEATURE REQUESTS INDICATING A SECURITY RISK

(71) Applicant: APIIRO LTD., Tel Aviv (IL)

(72) Inventors: Gil David, Herzliya (IL); Brit Arnon, Tel Aviv (IL); Eli Shalom, Tel Aviv-Jaffa (IL); Idan Plotnik, Herzliya (IL); Yonatan Eldar, Tel Aviv (IL)

(73) Assignee: APIIRO LTD., Tel Aviv (IL)

( * ) Notice: Subject to any disclaimer, the term of this patent is extended or adjusted under 35 U.S.C. 154(b) by 163 days.

(21) Appl. No.: 18/224,094

(22) Filed: Jul. 20, 2023

(65) Prior Publication Data

US 2024/0028301 A1 Jan. 25, 2024

Related U.S. Application Data (60) Provisional application No. 63/391,055, filed on Jul. 21, 2022.

(51) Int. Cl.
*G06F 8/10* (2018.01)
*G06F 40/30* (2020.01)
*G06Q 10/0635* (2023.01)

(52) U.S. Cl.
CPC ............... *G06F 8/10* (2013.01); *G06F 40/30* (2020.01); *G06Q 10/0635* (2013.01)

(58) Field of Classification Search
CPC .................................. G06F 8/10; G06F 40/30
USPC ................................ 717/104–121; 706/25–45
See application file for complete search history.

(56) References Cited

U.S. PATENT DOCUMENTS

| | | | | |
|---|---|---|---|---|
| 6,996,843 | B1* | 2/2006 | Moran | H04L 63/1408 706/45 |
| 8,925,092 | B1* | 12/2014 | Johansson | G06F 8/61 726/25 |
| 10,826,927 | B1* | 11/2020 | Assareh | H04L 63/1433 |
| 10,868,825 | B1* | 12/2020 | Dominessy | H04L 43/045 |
| 10,872,026 | B2* | 12/2020 | Wright | G06F 8/65 |
| 10,893,059 | B1* | 1/2021 | Aziz | H04L 63/14 |
| 11,552,975 | B1* | 1/2023 | Zhang | H04W 4/70 |
| 11,689,555 | B2* | 6/2023 | Cai | G06Q 10/0635 726/25 |
| 11,870,800 | B1* | 1/2024 | Kudale | H04L 63/20 |
| 12,346,820 | B1* | 7/2025 | Rahman | G06N 20/20 |
| 12,381,876 | B2* | 8/2025 | Jeffords | G06F 21/6218 |
| 2021/0133632 | A1* | 5/2021 | Elprin | G06F 11/3409 |

OTHER PUBLICATIONS

Palko et al, "Model of Information Security Critical Incident Risk Assessment", IEEE, pp. 1-5 (Year: 2020).*
Maule t al, "Risk Management Framework for Service-Oriented Architecture", IEEE, pp. 1-4 (Year: 2009).*
Xue et al, "Machine Learning Security: Threats, Countermeasures, and Evaluations", IEEE, pp. 1-23 (Year: 2020).*

(Continued)

*Primary Examiner* — Anil Khatri
(74) *Attorney, Agent, or Firm* — Rivka Friedman (57) ABSTRACT

A system and method for detecting feature requests that pose a potential security risk, including: collecting the feature requests from providers; and analyzing the feature requests to assess whether features requested in the feature requests will pose a security risk to the system once created.

15 Claims, 4 Drawing Sheets

(56) References Cited

OTHER PUBLICATIONS

Liu et al, "A Survey on Security Threats and Defensive Techniques of Machine Learning: A Data Driven View", IEEE, pp. 1-15 (Year: 2018).*

Dhinakaran et al, "Advanced Machine Learning Techniques for Enhancing Data Security in Cloud Computing Systems", IEEE, pp. 1-5 (Year: 2024).*

\* cited by examiner

SYSTEM, METHOD, AND PROCESS FOR DETECTING FEATURE REQUESTS INDICATING A SECURITY RISK

This patent application claims priority from, and the benefit of, U.S. Provisional Patent Application No. 63/391,055, filed Jul. 21, 2022, which is incorporated in its entirety as if fully set forth herein.

FIELD OF THE INVENTION

The invention relates to managing security/compliance risks during the development of features. Security/compliance risks are handled more effectively in the early phases of the Software Development Lifecycle (SDLC). At this early stage, features usually only have a textual description. This invention presents a mechanism to determine which features' future implementations are likely to introduce new risks that will need to be mitigated.

BACKGROUND OF THE INVENTION

Developing features also requires dealing with non-functional aspects of these features, such as security, compliance, and more. The non-functional aspects may require additional effort, a more careful design, a testing plan, legal coordination, and more. Many of these aspects are not part of the development team's expertise and not even part of the team's awareness. If the development team does not address those non-functional aspects at some phase of development, they will not be able to effectively mitigate the potential risks. If the potential risks are not mitigated at any phase of development, the risks may materialize, and cost the organization time, money, perception of competence and/or even legal repercussions. If at some point the risk materializes, or the risk is discovered and needs to be mitigated, a much greater effort will be required compared to having mitigated the potential risk at an early stage/during development. Since the development of the functional aspects of the features has already been done at this early stage, the non-functional aspects of implementation are likely to require adjustment of the original work. That rework will be costly, at least, in time and money, and essentially could have been avoided.

In the industry, it is common to document requirements in early phases of development. This documentation can be made in multiple forms, such as document systems, ticketing systems, messaging systems, etc. In this early phase, no development has been done, so planning for the non-functional aspects will save the potential future rework.

SUMMARY OF THE INVENTION

According to the present invention there is provided a method for detecting feature requests that pose a potential security risk, the method including: collecting the feature requests from providers; and analyzing the feature requests to assess whether features requested in the feature requests will pose a security risk to the system once created.

According to further features the method further includes normalizing the feature requests from different providers having different formats.

According to further features the feature requests are analyzed in real time. According to further features the feature requests are analyzed using manually defined rules. According to further features the feature requests are analyzed using a machine learning model.

According to further features the feature requests are analyzed by extracting the features from the feature requests, the extracting being text-based extraction or diagram-based extraction.

According to further features the method further includes mitigating risk in real time using an automated process. According to further features the automated process relies on at least one of: an assessed level of the risk, a determined confidence level, a key reason why there is risk, metadata, and linked entities.

According to another embodiment there is provided a system for detecting risky feature requests, including: a fetcher for collecting the feature requests from providers; and an analyzer for analyzing the feature requests to assess whether features requested in the feature requests will pose a security risk to the system once created.

According to further features the system further includes a unifier for converting/normalizing the feature requests from providers that have different formats into a unified format/representation.

According to further features the fetcher periodically pulls feature requests or updates to feature requests from the providers. According to further features the providers push feature requests or updates to feature requests to the fetcher.

According to further features the unifier converts each of the feature requests into a unified representation. According to further features the unifier converts the feature requests by extracting common features found in feature requests from different providers.

According to further features the analyzer consists of manually defined rules, a machine learning model, or a combination thereof. According to further features the analyzer assesses risk at least partially based on contributor expertise.

According to further features expertise is assigned to the contributor based on activity history of the contributor. According to further features the feature request is assigned to the contributor, based, at least partially, on the expertise of the contributor.

According to further features the system further includes: an automated risk mitigation service, configured to mitigate a risk based on at least one of: an assessed level of the risk, a determined confidence level, a key reason why there is risk, metadata, and linked entities.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a system, method, and process for detecting feature requests indicating a security risk according to the present invention may be better understood with reference to the drawings and the accompanying description.

The present invention introduces a new approach to detecting risky feature requests. The value is gained from increased detection coverage, where the alerts on detection are sent in a contextual and early phase. The invention also covers two approaches to ease the risk mitigation process by introducing support to fully automated processes and manual processes.

The invention covers end-to-end phases, from the collection of feature requests, linked entities, and organization metadata. Using that information, the mechanism enables a thorough and immediate detection of risky feature requests.

There is provided a mechanism that automatically detects non-functional aspects of software features in early stages of the Software Development Lifecycle (SDLC) from documented textual descriptions of those features found in the various communication or documentation media (hereafter referred to generally as "documentation" and variations thereof). The mechanism further alerts developers to these non-functional aspects, which can assist in achieving risk reduction during [early stages of] development, thereby reducing the overall cost.

This invention introduces a 3-layered mechanism for alerting and addressing non-functional requirements at the early stages of development:
1. Continuous tracking of feature requests across all sources.
2. Analysis of all feature requests in real-time.
3. Automation of risk mitigation process for insights.

The terms feature request, ticket, and document are used interchangeably herein, and generally referred to as "documentation" or "feature request".

Collection of Feature Requests

Feature request descriptions appear in documentation systems such as Jira®, GitHub®, MS Office®, Quip, Confluence®, etc. These documents and/or tickets etc. are more than pure static text: they can be updated, interacted with by multiple contributors, get metadata (such as labels), contain links to other documents, hold diagrams, and be linked to external resources such as pull requests.

Extensive and frequent collection of text and metadata enables the mechanism to detect risk; early feedback is valuable along with metadata to enhance the ability to differentiate between ambiguous feature requests.

Providers

It is challenging to collect feature requests from multiple sources (hereafter also referred to as "providers"), both with regard to scale and with regard to varied representations (i.e., the different formats that the documentation comes in). In order to effectively collect feature requests from varied providers, a relevant infrastructure is required.

Figure 1:
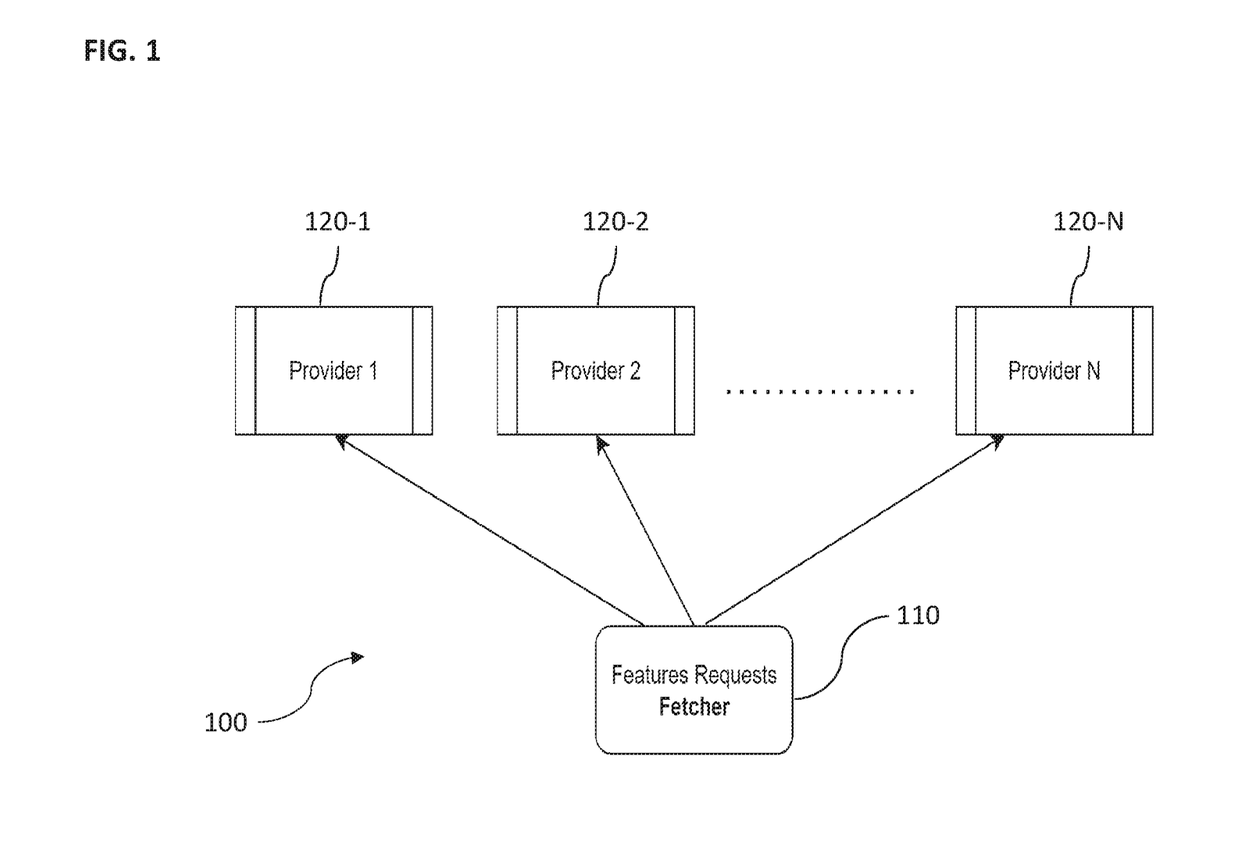
FIG. 1 is a pull model for feature requests.

The 'feature request collection' component (hereafter also referred to as a "fetcher") can work in two modes in order to keep the data in sync: a pull mode and a push mode. FIG. 1 illustrates a pull model for feature requests. For providers that do not support hook/callback on data updates, a periodic pull model 100 can be applied whereby the fetcher 110 periodically pulls feature requests and/or updates to feature requests from the providers 120-1, 120-2 . . . 120-N.

Figure 2:
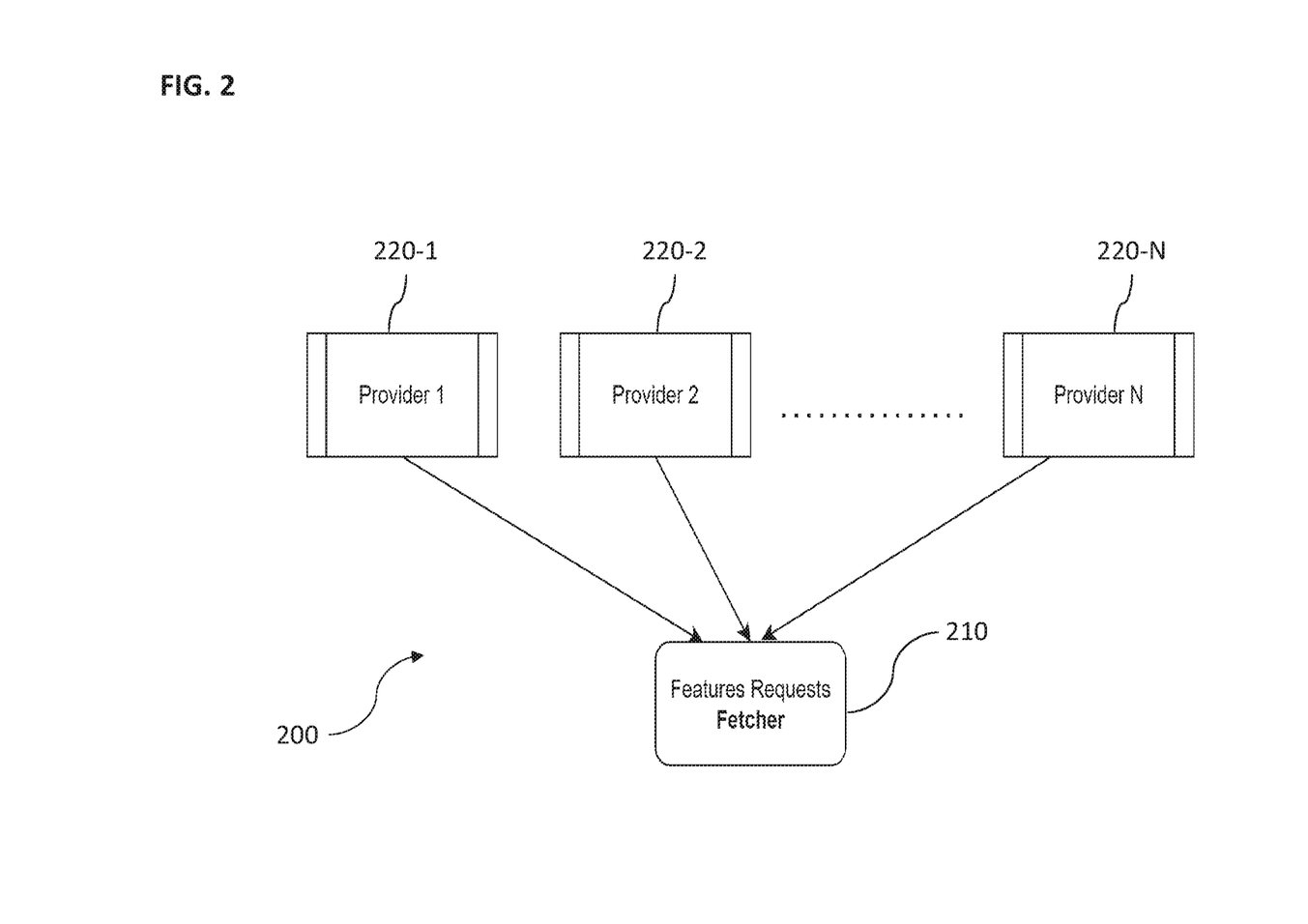
FIG. 2 is a push model for feature requests.

FIG. 2 illustrates a push model for feature requests. For providers that do support hooks, an on-demand push model 200 can be applied whereby providers 220-1, 220-2 . . . 220-N push feature requests on-demand to a fetcher 210.

Note that the usage of fetchers is not limited to feature requests, as other types of relevant data (e.g., code) may exist in some providers. One such mechanism is described in U.S. Ser. No. 11/301,356B2 which is incorporated by reference as if fully described herein.

Unified Representation

Figure 3:
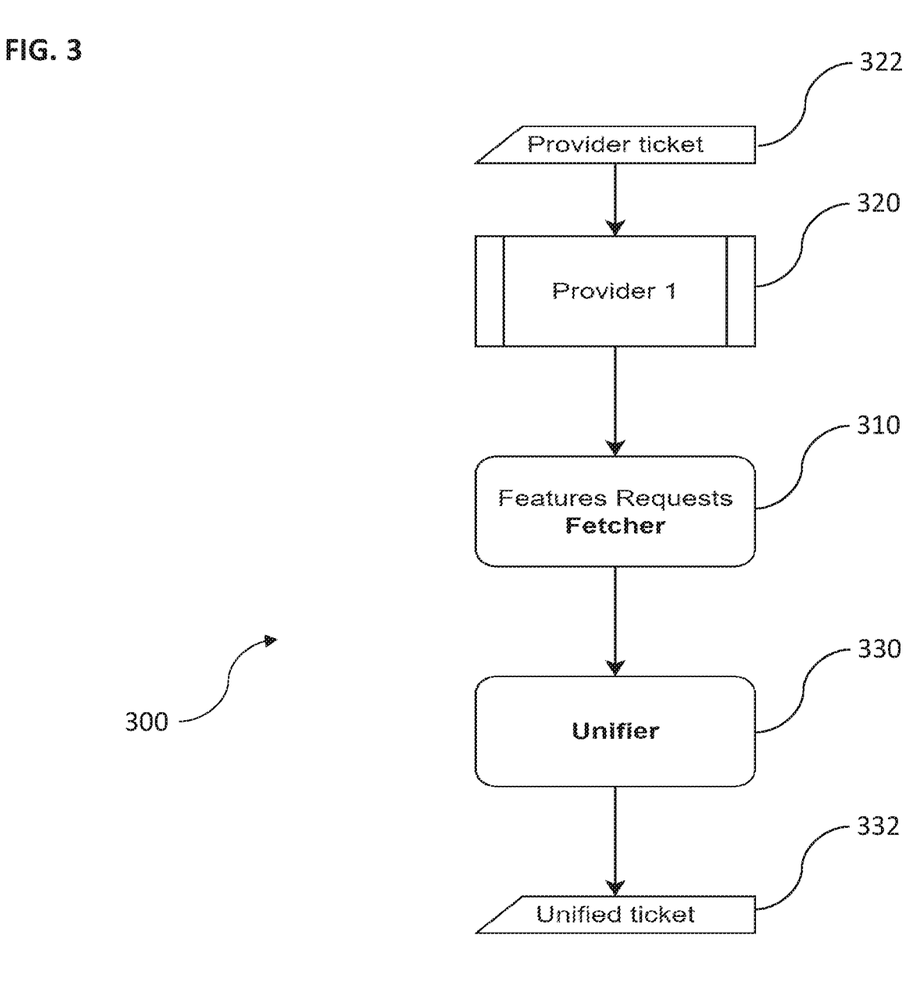
FIG. 3 is a flow diagram from a provider ticket to a unified ticket.

In order to be able to reuse the core logic [for identifying potential risks from feature requests] across all documentation formats, a unified representation of feature requests and linked entities is required. Such representation captures common features that appear in most providers in a way that allows the core logic to be agnostic of the original representation. A 'feature request format normalizer' component (hereafter also referred to as a "Unifier") extracts these common features from all forms of documentation. FIG. 3 illustrates a flow diagram from a provider ticket to a unified ticket. In FIG. 3, the Provider ticket 322 is generated by the provider 320. The ticket is forwarded to a fetcher 310 according to a pull or push model. The ticket is moved from the Fetcher 310 to a Unifier 330 which extracts the ticket data and converts the data into a unified format, outputting a unified ticket 332.

Integration

Given the two previous components, we have an up-to-date repository of features requests and linked entities. In order to facilitate the value of the system, such a repository should support integration in a similar way to the ones of the providers (push/pull). Such a repository can be built on a documents database (DB) with support for triggers to allow push notifications.

Non-Functional Aspects Detection

Extracting Features from Tickets

Text-Based Risk Extraction

The system can deduce, from the ticket's textual description, whether the feature is risky. A 'feature request analyzer' component (hereafter referred to as an "Analyzer") is configured to analyze whether the feature requested in the ticket will pose a security risk to the system. This can be done either by manually defining rules for detecting such tickets or by employing a machine learning model.

Manually-Defined Rules

The system can check if the description contains words from a specified set of "risky" words, and based on the number of such words, determine if the ticket is risky.

Risky words can belong to several categories, such as:
  Users' personal information (e.g., date of birth, home address, phone number),
  Payment processes (e.g., credit card, pin, account number, bank),
  Authentication (e.g., username, password, admin),
  New API (Application Programming Interface) endpoints (e.g., endpoint),
  Additional relevant categories.

The system can assign different weights to different categories.

Another set of important signals/indications/keywords are signals that indicate that the ticket is not risky. These can be words that show that the ticket is about UI (User Interface) changes, or configuration changes, or ML (machine learning) model training, and many others.

The positive and negative signals/keywords can be combined in a sophisticated way, to ensure that the risk detection is accurate.

ML-Based Model

A supervised ML (Machine Learning) model can be trained on a dataset of tickets from various sources. The labels for the dataset can be achieved in two ways. The first option is by using human taggers, with software understanding, who will read the ticket, estimate its expected consequences, and assign a label accordingly. The second option is to automatically compute the labels based on what happened in the ticket's lifecycle: the label will be true if the ticket is connected to a pull request that has material changes (see U.S. Ser. No. 11/301,356B2), or if it is connected to a security review, etc.

Given such a training set, an ML model can be trained to predict the correct labels. The vectorization can be based on word embedding or document embedding, or work with the words directly.

Diagram-Based Risk Extraction

In many documents/tickets, diagrams are added to convey the UI design, the architecture design, or a flow. Such diagrams contain information that may indicate the essence of the feature request. Therefore, a high-level classification of a diagram may improve the precision of feature request classification.

Such classification can be based on the computer vision approach. Since most of the common types of diagrams originated from commercial sources (e.g., Draw.IO or Zeplin), and they provide a lot of examples, along with many examples available in OSS projects, a set of training data can be compiled.

Additionally, given a high-level classification (e.g., architectural diagram), the text from the diagram can be extracted, and assuming a relevant module/process is mentioned, a more granular classification can be provided.

As used herein, throughout the document, the term or phrase "the system", when referring to performing an activity or process, is intended to mean that automated system processes, alone or in partial or complete collaboration with the administrators and/or security personnel running the system perform the activity or process. Alternatively, "the system uses" can be understood to referring to the administrators and/or security personnel who may perform the activity or process alone, without the use of automated systems.

Contributor Expertise Based Risk

According to other features of the invention, the analyzer assesses risk at least partially based on contributor expertise. Each contributor is assigned a set of top roles and their corresponding weights that reflect their significance for the contributor. The higher the weight (max weight=1.0) the more significant the role is for that contributor. For example, developer X is assigned with the roles {R1: 0.9, R2: 0.8, R3: 0.5}.

Each contributor is assigned a set of top expertise and their corresponding weights that reflect their significance for the contributor. The higher the weight (max weight=1.0) the more significant the expertise is for that contributor. For example, developer X is assigned with the roles {E1: 0.95, E2: 0.85, E3: 0.65, E4: 0.6}.

The assigned roles and expertise are used as building blocks for other detection and prediction mechanisms in the system. The roles and expertise can be assigned in various ways. For example, the roles and/or expertise can be assigned manually, automatically or semi-automatically.

Manual assignment entails a centralized system (for example, Active Directory or an HR system) that maintains a profile for each contributor that contains his/her roles and expertise. For each contributor, the manager/admin is responsible for updating the profile.

In automatic assignment the system uses machine learning methods to assign the relevant set of roles and expertise to each contributor. This is done by analyzing various activities and information in the system, and from external sources. Examples of activities and information include, but are not limited to: a set of committed material changes; the type of source files they were involved with; the type of tickets and PRs (pull requests) they were assigned with; the type of tickets and PRs they reviewed; the quality of their commits; the amount and velocity of commits and reviews; their public reputation (for example, GitHub®, StackOverflow); their LinkedIn® profile; and/or their StackOverflow activity—posts and answers;

With Semi-Automatic assignment, when given a partial set of manual assignments of roles and expertise to only some of the contributors, the system uses machine learning methods to assign to each of the other (and future) contributors the relevant set of roles and expertise. This is done by extracting a set of features for each contributor. Examples include, but are not limited to: the set of committed material changes; the type of source files they were involved with; the actual source files and other files they were involved with; the type of tickets and PRs they were assigned with; the type of tickets and PRs they reviewed; the amount and velocity of commits and reviews; and/or the set of other contributors usually participate in the same tickets and PRs.

Next, the system uses the extracted features to build a similarity metric between the unlabeled contributors and the manually labeled contributors. Based on the similarities we assign the corresponding roles and expertise.

Ticket-Contributor Graph Mechanism

A ticket-to-contributor graph is built by the system which is used to characterize tickets by contributors and vice versa.

This way, each contributor is characterized by the tickets s/he was involved with, weighted by the amount of involvement. The more the contributor was involved, the higher the weight.

Similarly, each ticket is characterized by the involved participants, weighted by their contribution.

This mechanism can be used to:
Find similarities between contributors
Find similarities between tickets
Group contributors into clusters
Group tickets into clusters Similarity Mechanism Between Contributors For each contributor, we extract a set of features from various sources. For example:
Internal sources
Tickets,
PRs,
Commits.
External sources
LinkedIn® profile, posts, and activities,
GitHub® profile, reputation, and activities,
StackOverflow profile, reputation, posts, and answers.
The features correspond to various aspects of their activities. For example:
The set of committed material changes;
The type of source files they were involved with;
The actual source files and other files they were involved with;
The type of tickets and PRs they were assigned with;
The type of tickets and PRs they reviewed;
The amount and velocity of commits and reviews;
The set of other contributors usually participate in the same tickets and PRs;
The type of their posts in external data sources like LinkedIn and StackOverflow;
Their public reputation;
Their expertise and roles;
Their organizational location in the organization;
Managers
Co-workers
Departments The security groups and email groups they belong to;
The ticket-contributor graph characterization.
The extracted features are used to build a similarity metric between the contributors that can be used to:
Find the top k similar contributors;
Assign a peer group of contributors; and
Clustering of contributors.

Similarity Mechanism Between Tickets
For each ticket, the system extracts a set of features. For example:
Textual features
Keywords, topics, categories
Meta-data
Participants (reviewers, assignees, discussion)
PRs
Material changes, type of source code, participants
The ticket-contributor graph characterization
The extracted features are used to build a similarity metric between the tickets that can be used to:
Find the top k similar tickets;
Assign a peer group of tickets;
Clustering of tickets.

Detect Mismatches Between Contributor and Ticket
First, the system assigns each ticket with one or multiple categories based on our category detection mechanism.
Then, the system analyzes the involved contributors to detect mismatches between the contributors and the tickets as follows:
Mismatched role or expertise
The detected categories of the ticket are not overlapped with the contributor's roles or expertise;
The categories of the historical tickets of the contributor do not overlap with the analyzed ticket;
In those cases, the system can recommend better fits for the ticket's contributors, based on their expertise and the categories of the assessed ticket.

Detect Mismatches Between Reviewer and Assignee
The system uses the expertise detection mechanism to find mismatches between the expertise of the reviewer and the expertise of the assignee. Such mismatch might imply a poor fit between the reviewer and the assignee. In those cases, the system can recommend better fits for the reviewer and the assignee, based on their expertise and the categories of the assessed ticket.

Recommendation System for Contributors Per Analyzed Tickets
The recommendation system is based on a fusion of various methods and data sources: In embodiments, the system employs expertise-based recommendation and/or historical analysis-based recommendation.

In embodiments, expertise-based recommendation includes the following steps: First, the system (manually or automatically) assigns each ticket with one or multiple categories based on the category detection mechanism. Next, the system uses the contributors' expertise detection mechanism to find the contributors with the most relevant expertise.

In embodiments, historical analysis-based recommendation includes the following steps: Initially, the system uses the ticket similarity mechanism to find the most similar tickets. Next, the system builds a set of the involved contributors and assigns them weights based on the significance of their activity in the historical tickets. Lastly, the system builds a corresponding candidates list, prioritized based on the weights.

Contributors
For each analyzed ticket, the system (manually [i.e., by administrators and/or security personnel] and/or automatically) finds the most similar tickets using the tickets similarity mechanism. Those tickets are used to identify the roles, expertise, contributors, and teams that were involved with the historical tickets. Then, the system predicts which contributors and teams are more likely to participate in the assessed ticket.

This process can be used to: recommend the roles and expertise required for the ticket; recommend contributors (reviewer and assignee) that best fit the ticket; recommend the teams that best fit the ticket; and/or predict if a ticket is likely to be developed by multiple teams requiring synchronization in details/design.

Detection of Conflicting Tickets
The system (manually [i.e., by administrators and/or security personnel] and/or automatically) uses the ticket-contributor graph mechanism and the ticket similarity mechanism to identify clusters of highly similar active tickets. Similar active tickets can have conflicting requirements and/or conflicting contributors.

To detect conflicting requirements, the following process is employed: For each ticket in each cluster, the system extracts the corresponding requirements and the predicted actions (for example, add auth, remove PII [Personally Identifiable Information]). Next, the system detects conflicting requirements within each cluster (for example, add auth in one ticket and remove auth in another).

To detect conflicting contributors, the following process is employed: For each ticket in each cluster, the system extracts the corresponding contributors and their corresponding teams. Next, the system detects conflicting teams within each cluster that are going to work in parallel on the same code.

Detection of Duplicated Tickets
The system uses the ticket-contributor graph mechanism and the ticket similarity mechanism to identify clusters of highly similar active tickets. For each ticket in each cluster, the system extracts the corresponding requirements, story, and the predicted actions to detect duplicate tickets.

Action Prediction
For each assessed ticket, the system uses the ticket-contributor graph mechanism and the ticket similarity mechanism to find the most similar historical tickets. From each historical ticket, the system extracts the chain of applied operational actions. The system uses them to build a transition matrix (for example, Markov chain or diffusion matrix) that predicts the most probable actions that should be applied for the assessed ticket.

We use these insights to: recommend operational actions; detect anomalous actions; and/or alert as to missing actions.

Explainability
It is important that the system is able to provide an explanation for why a certain ticket has been marked as risky. This will allow appropriate, relevant follow-up: trigger a security review, a compliance questionnaire, etc. Additionally, an explanation also provides context that can shorten manual work by providing an initial analysis.

Explainability can be built using several approaches, including Ontology and ML-Based Models.

Figure 4:
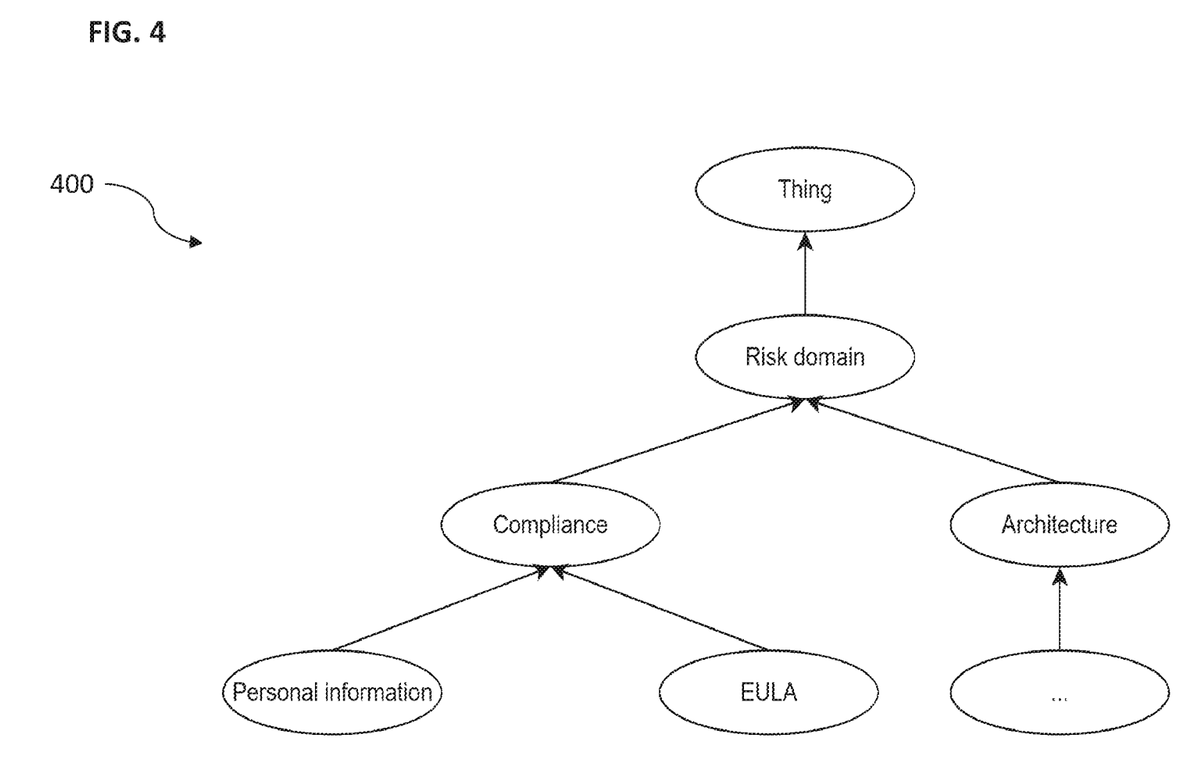
FIG. 4 is an example high-level ontology-based classification 400 indicating is-a relations.

Ontology
In the vast majority of cases, the same classifications are likely to be needed. Therefore, a single structure of categories can be applied to all users. FIG. 4 illustrates an example high-level ontology-based classification 400 indicating is-a relations.

Such a hierarchy provides a multi-level classification by which action is required (e.g., manual review for all compliance risks, and a questionnaire for personal information risks).

In order to make the classification feasible, we can add sub-concepts (even if not visible to the end-user) and add attributes to concepts. On top of the semantic layer of concepts and attributes, a syntactic layer with tokens can be added. Based on the ontology and a natural language parser, topics and the relevancy of sentences can be extracted. Using the topics of the sentences, classification for the whole ticket can be achieved. Note that multiple classifications are available for a single ticket using this mechanism.

ML-Based Model

Given that classical textual characteristics exist in feature request descriptions, supervised models for topic extraction apply.

A training set can be created using two approaches. The first approach is manual tagging of features. In this approach, taggers with software understanding can review a set of features requests, estimate the required actions to implement the feature, and tag the feature request accordingly. The second approach is to track past feature requests and their activity, and out of those that were reviewed by a security practitioner, to tag the tickets according to the taken actions.

Given training data, an ML model can be trained. The vectorization can be based on word embedding or document embedding, or work with the words directly.

From both approaches, the prediction model gets a document and metadata and predicts the score for each reason that may cause risk in the implementation.

Risk Mitigation Automation

Based on the last component of feature request detection, real-time reasoned detection is available. Therefore, given a risk score that is based on severity & confidence, along with explainability cues, granular automation is possible. Such automation can depend on the level of the risk, on the confidence level, on the key reason for risk (e.g., compliance/architecture), and on metadata and linked entities.

For example, if an organization follows General Data Protection Regulation (GDPR), and a feature request suggests that interacting with personal information will be needed, a compliance questionnaire may be requested prior to technical design.

Such automation can initiate a fully automated process (e.g., request filling a questionnaire or initiating a static code analysis), or, it can trigger a manual process (e.g. design review).

Such automation can capture anything a standard flow can express, like conditions or raw data or generated insights, run an internal process, or start an external process.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for detecting feature requests that pose a potential security risk, the method comprising:
    obtaining a plurality of feature requests with manually or automatically assigned labels wherein each of the labels indicates an expected consequence of the feature requests to which the labels are assigned;
    training a supervised machine learning model that assesses feature requests by providing a training set including at least some of the labeled feature requests;
    by the trained supervised machine learning model, analyzing new feature requests from providers; and
    outputting predictions for the new feature requests indicating whether features requested in the new feature requests will pose a security risk to the system once created;
    mitigating risk in real time using an automated process for each of the new feature requests assessed to pose a security risk to the system once created,
    wherein the automated process relies on at least one of: an assessed level of the risk, a determined confidence level, a key reason why there is risk, metadata, and linked entities;
    wherein the new feature requests further are analyzed by extracting the features from the new feature requests, the extracting being text-based extraction or diagram-based extraction.

2. The method of claim 1, further comprising:
    normalizing the feature requests from different providers having different formats.

3. The method of claim 1, wherein the new feature requests are inputted into the trained supervised machine learning model in real time.

4. The method of claim 1, wherein the new feature requests are further analyzed using manually defined rules.

5. The method of claim 1, wherein the new feature requests are further assessed based on expertise and assigned roles of each contributor,
    wherein a set of top roles and their corresponding weights which reflect a significance thereof for the respective contributor; and
    wherein a set of top expertise and their corresponding weights that reflect their significance for the respective contributor.

6. A computer system for detecting risky feature requests, comprising:
    a non-transitory storage medium for executing computer components; and
    a computerized processor for executing the computer components comprising:
    a feature request collection component for collecting the feature requests from providers;
    a feature request analyzer component for analyzing the feature requests to assess whether features requested in the feature requests will pose a security risk to the system once created; and
    an automated risk mitigation service, configured to mitigate a risk of each of the feature requests assessed to pose a security risk, based on at least one of: an assessed level of the risk, a determined confidence level, a key reason why there is risk, metadata, and linked entities;
    wherein the new feature requests further are analyzed by extracting the features from the new feature requests, the extracting being text-based extraction or diagram-based extraction.

7. The computer system of claim 6, further comprising:
    a feature request format normalizer component for converting the feature requests from providers that have different formats into a unified format.

8. The computer system of claim 7, wherein the feature request format normalizer component converts each of the feature requests into a unified representation.

9. The computer system of claim 8, wherein the feature request format normalizer component converts the feature requests by extracting common features found in feature requests from different providers.

10. The computer system of claim 6, wherein the feature request collection component periodically pulls feature requests or updates to feature requests from the providers.

11. The computer system of claim 6, wherein the providers push feature requests or updates to feature requests to the feature request collection component.

12. The computer system of claim 6, wherein the feature request analyzer component consists of manually defined rules, a machine learning model, or a combination thereof.

13. The computer system of claim 6, wherein the feature request analyzer component assesses risk at least partially based on contributor expertise.

14. The computer system of claim 13, wherein expertise is assigned to the contributor based on activity history of the contributor.

15. The computer system of claim 14, wherein the feature request is assigned to the contributor, based, at least partially, on the expertise of the contributor.

\* \* \* \* \*